United States Patent
Goh et al.

(10) Patent No.: US 10,103,406 B2
(45) Date of Patent: Oct. 16, 2018

(54) LITHIUM SECONDARY BATTERY

(71) Applicant: SAMSUNG SDI CO., LTD., Yongin-si, Gyeonggi-do (KR)

(72) Inventors: Eunyoung Goh, Yongin-si (KR); Jiwoon Lee, Yongin-si (KR); Jinhyon Lee, Yongin-si (KR); Jongki Lee, Yongin-si (KR); Kiyoung Jeong, Gyeryong-si (KR); Minje Park, Seoul (KR); Jeong-Ju Cho, Suwon-si (KR); Jongho Jeon, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 394 days.

(21) Appl. No.: 14/918,461

(22) Filed: Oct. 20, 2015

(65) Prior Publication Data

US 2016/0118691 A1 Apr. 28, 2016

(30) Foreign Application Priority Data

Oct. 22, 2014 (KR) ........................ 10-2014-0143594

(51) Int. Cl.
| | |
|---|---|
| *H01M 10/0569* | (2010.01) |
| *H01M 10/0525* | (2010.01) |
| *H01M 10/0564* | (2010.01) |
| *H01M 4/133* | (2010.01) |
| *H01M 4/587* | (2010.01) |
| H01M 4/36 | (2006.01) |
| H01M 4/62 | (2006.01) |
| H01M 4/02 | (2006.01) |

(52) U.S. Cl.
CPC ....... *H01M 10/0569* (2013.01); *H01M 4/133* (2013.01); *H01M 4/587* (2013.01); *H01M 10/0525* (2013.01); *H01M 10/0564* (2013.01); H01M 4/366 (2013.01); H01M 4/625 (2013.01); H01M 2004/021 (2013.01); H01M 2004/027 (2013.01); H01M 2300/0028 (2013.01)

(58) Field of Classification Search
None
See application file for complete search history.

(56) References Cited

U.S. PATENT DOCUMENTS

| | | | |
|---|---|---|---|
| 2009/0017374 A1 | 1/2009 | Saito et al. | |
| 2013/0216918 A1* | 8/2013 | Tokuda | H01M 4/134 429/327 |

FOREIGN PATENT DOCUMENTS

| | | |
|---|---|---|
| JP | 2005-228642 A | 8/2005 |
| KR | 10-2004-0056895 A | 7/2004 |
| KR | 10-2009-0005973 A | 1/2009 |
| KR | 10-1020346 B1 | 3/2011 |
| KR | 10-1277732 B1 | 6/2013 |

OTHER PUBLICATIONS

English machine translation of Japanese Publication No. JP 2005-228642 A, dated Aug. 25, 2005, 17 pages.
Korean Patent Abstracts Publication No. 10-2009-0027574 A, dated Mar. 17, 2009, for KR 10-1020346 B1, 1 page.
Korean Patent Abstracts Publication No. 10-2013-0003884 A, dated Jan. 9, 2013, for KR 10-1277732 B1, 1 page.

* cited by examiner

*Primary Examiner* — Ladan Mohaddes
(74) *Attorney, Agent, or Firm* — Lewis Roca Rothgerber Christie LLP

(57) ABSTRACT

A lithium secondary battery includes a thick-film negative electrode having a current density of about 4.0 mA/cm$^2$ to about 7.0 mA/cm$^2$ and a low-viscosity electrolytic solution having a viscosity of about 3 cP or less. Since the electrolytic solution includes a propionate-based ester compound, impregnation of the electrolytic solution in electronic devices having a thick-film negative electrode and lifespan characteristics of the devices may be improved.

12 Claims, 6 Drawing Sheets

LITHIUM SECONDARY BATTERY

CROSS-REFERENCE TO RELATED APPLICATION

This application claims priority to and the benefit of Korean Patent Application No. 10-2014-0143594, filed on Oct. 22, 2014, in the Korean Intellectual Property Office, the disclosure of which is incorporated herein in its entirety by reference.

BACKGROUND

1. Field

One or more aspects of embodiments of the present invention relate to lithium secondary batteries.

2. Description of the Related Art

With the development of compact and mobile electronic devices such as digital cameras, cell phones, laptops, and personal computers, there has been an increasing demand for lithium secondary batteries as an energy source for these devices. Also, the spread of hybrid electric vehicles (HEVs), plug-in hybrid electric vehicles (PHEVs), and electric vehicles (EVs), has prompted the development of high-capacity and safe lithium secondary batteries.

In connection with the development of lithium secondary batteries, research on various methods of increasing battery capacity has been conducted.

According to one of the methods of increasing battery capacity, a thick-film electrode having a high current density and a thick electrode material mixture layer may be used in lithium secondary batteries. However, although capacity and energy density per unit volume of a battery may increase according to this method, various other properties of the battery may deteriorate. Particularly, as thickness of the electrode increases, impregnation properties of an electrolytic solution and the mobility of lithium ions deteriorate. In addition, as the thickness of the electrode increases, electrical resistance applied to an electrode plate or resistance of lithium ions increases, thereby reducing rate properties. Accordingly, lifespan characteristics, characteristics at low temperature, and the like may deteriorate.

These properties may deteriorate more in thick-film negative electrodes rather than in thick-film positive electrodes. This is because in typical lithium batteries, electrolytic solutions are polar aprotic organic solvents, negative active materials are hydrophobic carbonaceous materials, and positive active materials are hydrophilic lithium metal oxides. Thus, in a thick-film negative electrode including a large amount of carbonaceous material, impregnation properties of the electrolytic solution and the mobility of lithium ions deteriorate more than in a thick-film positive electrode, and as a result, lithium is deposited on the surface of the negative electrode and forms lithium dendrite. Furthermore, continuous side reactions between the lithium dendrite and the electrolytic solution may increase resistance, and decrease in the amount of the electrolytic solution may further deteriorate other properties of the battery.

Therefore, there is a need to develop methods of improving rate properties and lifespan characteristics of lithium secondary batteries that include a thick-film negative electrode by improving the impregnation of the electrolytic solution into the thick-film negative electrode and the mobility of the lithium ions.

SUMMARY

One or more aspects of embodiments of the present invention include a lithium secondary battery including a thick-film negative electrode having a current density of about 4.0 mA/cm² to about 7.0 mA/cm² and an electrolytic solution having a viscosity of 3 cP or less and including a propionate-based ester compound in a non-aqueous organic solvent. The resulting lithium secondary battery may have excellent properties for the impregnation of the electrolytic solution and excellent lifespan characteristics.

Additional aspects will be set forth in part in the description which follows and, in part, will be apparent from the description, or may be learned by practice of the presented embodiments.

According to one or more embodiments, a lithium secondary battery includes a negative electrode, a positive electrode, and an electrolytic solution, the negative electrode having a current density of about 4.0 mA/cm² to about 7.0 mA/cm², the electrolytic solution including a lithium salt and a non-aqueous organic solvent, the non-aqueous organic solvent including at least 75% by volume of a propionate-based ester compound based on a total volume of the non-aqueous organic solvent, the propionate-based ester compound including at least 85% by volume of a propionate-based ester compound having at least 5 carbon atoms based on a total volume of the propionate-based ester compound, and the electrolytic solution having a viscosity of 3 cP or less.

A loading level of the negative electrode may be in a range of about 10 mg/cm² to about 20 mg/cm².

The negative electrode may include a current collector and a negative electrode mixture layer, the negative electrode mixture layer may include a negative active material, and the negative electrode mixture layer may have a thickness of about 60 μm to about 130 μm.

The negative active material may include crystalline carbon.

The crystalline carbon further comprises an amorphous carbon coating layer on the surface of the crystalline carbon.

The crystalline carbon may include natural graphite.

The natural graphite may be spherical natural graphite.

An amount of the natural graphite may be at least 50% by weight based on a total weight of the negative active material.

The propionate-based ester compound may be represented by Formula 1:

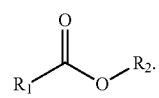

Formula 1

In Formula 1, $R_1$ is an unsubstituted ethyl group or an ethyl group substituted with a halogen atom, and $R_2$ is a linear or branched unsubstituted C1-C6 alkyl group or a linear or branched C1-C6 alkyl group substituted with a halogen atom.

The propionate-based ester compound having at least 5 carbon atoms may be represented by Formula 2:

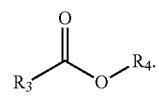

Formula 2

In Formula 2, $R_3$ is an unsubstituted ethyl group or an ethyl group substituted with a halogen atom, and $R_4$ is a linear or branched unsubstituted C2-C6 alkyl group or a linear or branched C2-C6 alkyl group substituted with a halogen atom.

The propionate-based ester compound having at least 5 carbon atoms may be an ethyl propionate-based ester compound.

The propionate-based ester compound may further include a methyl propionate-based ester compound.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
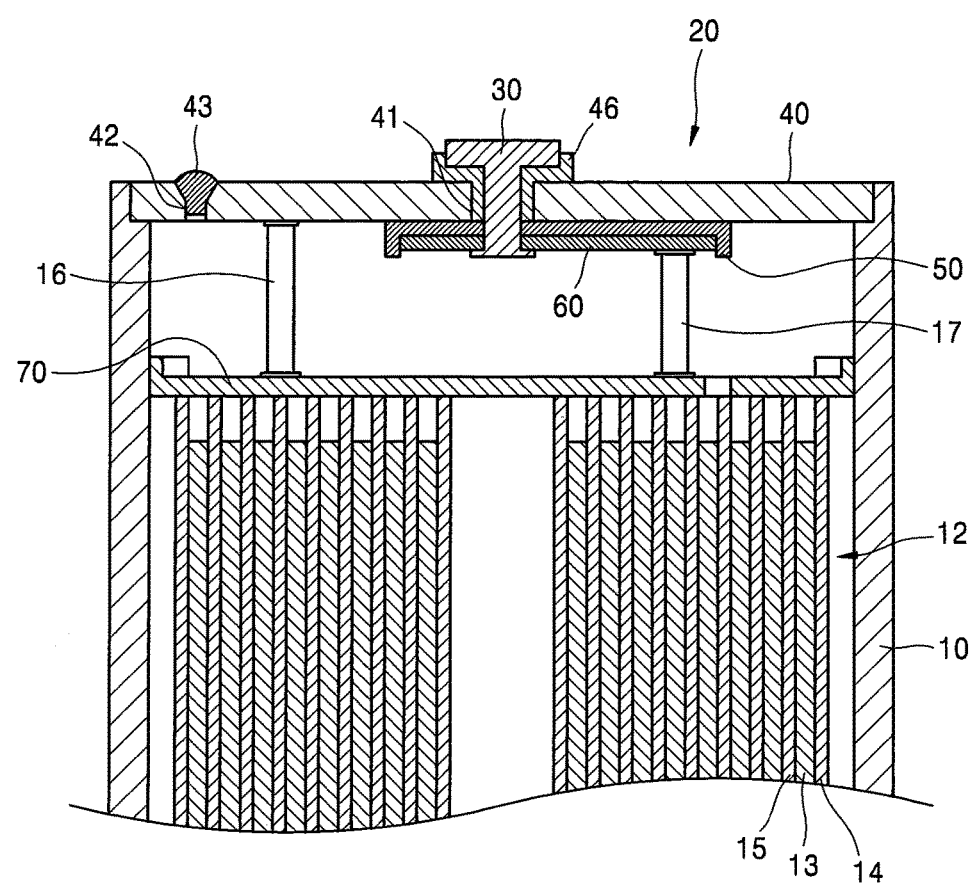
FIG. 1 is a schematic diagram of a structure of a lithium battery according to an exemplary embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. Expressions such as "at least one of," when preceding a list of elements, modify the entire list of elements and do not modify the individual elements of the list. Further, the use of "may" when describing embodiments of the present invention refers to "one or more embodiments of the present invention." In addition, as used herein, the terms "use," "using," and "used" may be considered synonymous with the terms "utilize," "utilizing," and "utilized," respectively. Also, the term "exemplary" is intended to refer to an example or illustration.

A lithium secondary battery according to an exemplary embodiment includes a negative electrode, a positive electrode, and an electrolytic solution. The negative electrode has a current density of about 4.0 mA/cm$^2$ to about 7.0 mA/cm$^2$, and the electrolytic solution includes a lithium salt and a non-aqueous organic solvent. The non-aqueous organic solvent includes at least 75% by volume of a propionate-based ester compound based on a total volume of the non-aqueous organic solvent, and the propionate-based ester compound includes at least 85% by volume of a propionate-based ester compound having at least 5 carbon atoms based on a total volume of the propionate-based ester compound, and the resulting electrolytic solution has a viscosity of 3 cP or less.

The current density of the negative electrode of the lithium secondary battery may be in a range of about 4.0 mA/cm$^2$ to about 7.0 mA/cm$^2$. For example, the current density of the negative electrode of the lithium secondary battery may be in a range of about 5.5 mA/cm$^2$ to about 7.0 mA/cm$^2$. When the current density of the negative electrode is within any of the ranges described above, battery capacity may be increased, and rate properties and lifespan characteristics of the battery may be effectively improved, since the negative electrode has sufficient wettability with the electrolytic solution according to an exemplary embodiment.

The negative electrode of the lithium secondary battery may have a loading level of about 10 mg/cm$^2$ to about 20 mg/cm$^2$. For example, the negative electrode of the lithium secondary battery may have a loading level of about 14 mg/cm$^2$ to about 20 mg/cm$^2$. Here, the "loading level" refers to the amount of an active material per unit area of an electrode and is a factor calculated by taking into account a diffusion coefficient of lithium ions, conduction between particles, and a path to a current collector. When the loading level of the negative electrode is within any of the ranges described above, the negative electrode may have a current density within the ranges described above, and manufacturing costs for batteries may be reduced.

In some embodiments, the negative electrode of the lithium secondary battery includes a current collector and a negative electrode mixture layer. The negative electrode mixture layer includes a negative active material. The negative electrode mixture layer may have a thickness of about 60 μm to about 130 μm. For example, the negative electrode mixture layer may have a thickness of about 80 μm to about 130 μm. When the thickness of the negative electrode mixture layer is within any of the ranges described above, the negative electrode may have a sufficient amount of the negative active material for obtaining the current density of the negative electrode within the ranges described above, and thus, a desired battery capacity may be obtained.

The negative active material of the lithium secondary battery may include a carbonaceous material. The carbonaceous material may be crystalline carbon, amorphous carbon, or any mixture thereof.

In some embodiments, the negative active material of the lithium secondary battery may include crystalline carbon.

The crystalline carbon may include graphite. For example, the graphite may include natural graphite. The natural graphite is naturally mined graphite and is distinguished from artificial graphite manufactured by carbonizing coal-based pitch and petroleum-based pitch at a temperature of 2500° C. or greater. The natural graphite may be graphite in an amorphous, plate-shaped, flake-shaped, fibrous, or spherical form. For example, the natural graphite may be spherical natural graphite.

The spherical natural graphite may be prepared by one or more processes including, without limitation, pulverizing particles of the natural graphite and post-processing. The spherical natural graphite is typically inexpensive and may realize a capacity similar to a theoretical capacity, as compared with artificial graphite. In addition, as compared with raw natural graphite, the surface of the negative active material including spherical natural graphite may have reduced electrolyte degradation reactions since specific surface area of the negative active material is reduced, and electrolyte impregnation properties may be improved since an electrode plate having large pores may be formed. Furthermore, a packing density of the negative electrode is increased, and the coating uniformity of the electrode may be improved.

The amount of the natural graphite may be at least 50% by weight, for example, in a range of about 80% by weight to about 90% by weight, based on a total weight of the negative active material. When the amount of the natural graphite is within any of the ranges described above, the negative active material may have a shape that is suitable for impregnation of the electrolytic solution, and a battery including the natural graphite may have a flat discharge curve.

The crystalline carbon may further comprise an amorphous carbon coating layer disposed on the surface of the crystalline carbon.

The amorphous carbon coating layer may include amorphous carbon selected from soft carbon, hard carbon, mesophase pitch carbide, calcined coke, sucrose, glucose, polyvinyl pyrrolidone (PVP), polyethylene glycol (PEG), polyvinyl alcohol (PVA), carbon nanofiber (CNF), and any mixture thereof.

In some embodiments, the negative active material of a lithium secondary battery may include natural graphite having an amorphous carbon coating layer on the surface thereof. For example, the natural graphite may be spherical natural graphite. When the natural graphite is coated with amorphous carbon, strength of the natural graphite may be improved by the coating, and the risk of the electrolytic solution breaking the edges of the natural graphite may be reduced since the edge surfaces of the natural graphite are not directly exposed. Thus, the negative active material including the amorphous carbon-coated spherical natural graphite may have improved particle strength and a shape that is suitable for impregnation with the electrolytic solution. Thus, the negative active material may be suitable for a thick-film negative electrode.

A thickness of the amorphous carbon coating layer may be in a range of about 3 nm to about 50 nm. When the thickness of the amorphous carbon coating layer is within the range described above, a sufficient conduction path may be provided without decreasing battery capacity.

The amorphous carbon coating layer may be formed using a dry coating method or liquid coating method, without being limited thereto. Non-limiting examples of the dry coating method include chemical vapor deposition (CVD) and physical deposition (e.g., physical vapor deposition), and non-limiting examples of the liquid coating method include impregnation and spray coating. When the liquid coating method is used, dimethyl sulfoxide (DMSO), tetrahydrofuran (THF), and/or the like may be used as a solvent.

In some embodiments, the amorphous carbon coating layer may be formed by coating a carbon precursor on natural graphite and heat-treating the coated natural graphite in an inert atmosphere such as in an argon or nitrogen atmosphere at a temperature of about 400° C. to about 1200° C. for about 1 hour to about 10 hours. The carbon precursor is carbonized by the heat-treatment and is converted into amorphous carbon, thereby forming an amorphous carbon coating layer on the core. The carbon precursor may be mesophase pitch, coal-based pitch, petroleum-based pitch, coal-based oil, petroleum-based heavy oil, and/or polymer resin such as polyimide resin, phenol resin, and/or furan resin, without being limited thereto.

The negative active material may further include artificial graphite in addition to the natural graphite. Since artificial graphite is typically manufactured at a high temperature equal to or greater than 2500° C. so as to form the crystalline structure of graphite, the artificial graphite has a more stable structure than natural graphite and has a relatively longer lifespan due to a low risk of cracking during charging and discharging. Thus, when a mixture of the natural graphite coated with amorphous carbon and the artificial graphite is used, the wettability by the electrolytic solution and lifespan characteristics of the battery may be improved. Non-limiting examples of the artificial graphite include mesophase carbon microbeads (MCMB).

In addition to the natural graphite having a coating layer, the artificial graphite may also have an amorphous carbon coating layer on the surface thereof.

Alternatively, the negative active material may be prepared by mixing the artificial graphite and natural graphite, utilizing the mixture to prepare spherical particles, and forming an amorphous carbon coating layer on surfaces of the spherical particles. The amount of the artificial graphite may be in a range of about 2% by weight to about 50% by weight, for example, about 10% by weight to about 20% by weight, based on the total weight of the negative active material. When the amount of the artificial graphite is within any of the ranges described above, battery performance deterioration that may be caused by disconnection of a conduction path due to an increase in thickness of a negative electrode plate as a result of shrinkage and expansion of the negative active material during charging and discharging may be prevented or reduced. This is because the electrical conductivity of the battery may be maintained since the artificial graphite serves as a buffer within the negative active material.

The negative active material may have an average particle diameter of about 5 µm to about 30 µm, for example, about 15 µm to about 25 When the average particle diameter of the negative active material is within any of the ranges described above, a negative electrode plate having large pores may be prepared, and accordingly, the impregnation properties of the electrolytic solution may be improved.

The average particle diameter as used herein refers to D50, which is a cumulative particle diameter at 50% of a total cumulative particle diameter distribution of particles when arranged from the smallest particle diameter (i.e. in order of ascending particle diameter). D50 may be measured using one or more suitable methods, for example, using a particle size analyzer, transmission electron microscopy (TEM), and/or scanning electron microscopy (SEM). Alternatively, D50 may be obtained by measuring the particle diameter with a dynamic light-scattering device, counting the number of particles within each particle diameter range by analyzing data, and calculating D50 therefrom.

The negative active material may have at least one technical characteristic such as the composition or particle diameter in addition to those of the negative active material as described above and may further include one or more additional substance commonly used in the art to form the negative active material.

Non-limiting examples of the additional substance commonly utilized in the art to form the negative active material may include lithium metal, metal alloyable with lithium, transition metal oxide, and non-transition metal oxide.

For example, the metal alloyable with lithium may be at least one selected from silicon (Si), Tin (Sn), aluminium (Al), gallium (Ge), lead (Pb), bismuth (Bi), antimony (Sb), a Si-Y alloy (where Y is an alkali metal, an alkali earth metal, a Group 13 element, a Group 14 element, a transition metal, a rare-earth element, or a combination thereof, and Y is not Si), or a Sn-Y alloy (where Y is at least one selected from an alkali metal, an alkali earth metal, a Group 13 element, a Group 14 element, a transition metal, a rare-earth element, or a combination thereof, and Y is not Sn). Y may be magnesium (Mg), calcium (Ca), strontium (Sr), barium (Ba), radium (Ra), scandium (Sc), yttrium (Y), titanium (Ti), zirconium (Zr), hafnium (Hf), rutherfordium (Rf), vanadium (V), niobium (Nb), tantalum (Ta), dubnium (Db), chromium (Cr), molybdenum (Mo), tungsten (W), seaborgium (Sg), technetium (Tc), rhenium (Re), bohrium (Bh), iron (Fe), lead (Pb), ruthenium (Ru), osmium (Os), hassium (Hs), rhodium (Rh), iridium (Ir), palladium (Pd), platinum (Pt), copper (Cu), silver (Ag), gold (Au), zinc (Zn), cadmium (Cd), boron (B), aluminum (Al), gallium (Ga), tin (Sn), indium (In), titanium (Ti), germanium (Ge), phosphorus (P), arsenic (As), antimony (Sb), bismuth (Bi), sulfur (S), selenium (Se), tellurium (Te), polonium (Po), or a combination thereof.

For example, the transition metal oxide may include lithium titanium oxide, vanadium oxide, lithium vanadium oxide, and/or the like.

For example, the non-transition metal oxide may be $SnO_2$, $SiO_x$ (where $0<x<2$), and/or the like.

The electrolytic solution of the lithium secondary battery may include a lithium salt and a non-aqueous organic solvent and may have a viscosity of about 3 cP or less, for example, in a range of about 1 cP to about 3 cP. When the viscosity of the electrolytic solution is within any of the ranges described above, the negative electrode having the aforementioned current density may be sufficiently impregnated with the electrolytic solution, and may have an ability to dissociate lithium salts. Thus, deposition of lithium and formation of lithium dendrite may be prevented or reduced, and accordingly, the lifespan characteristics of the battery may be improved.

In some embodiments, the electrolytic solution includes a propionate-based ester compound. The propionate-based ester compound may be represented by Formula 1 below.

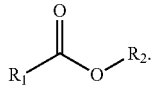

Formula 1

In Formula 1, $R_1$ is an ethyl group that is either unsubstituted or substituted with a halogen atom, and $R_2$ is a linear or branched C1-C6 alkyl group that is either unsubstituted or substituted with a halogen atom.

The propionate-based ester compound represented by Formula 1 is a linear ester having a relatively low reactivity to a carbonaceous negative active material and a lower melting point and a higher specific dielectric constant than those of a linear carbonate-based ester compound such as dimethyl carbonate (DMC), diethyl carbonate (DEC), or ethyl methyl carbonate (EMC). Thus, rate properties of the battery may be improved due to the propionate-based ester compound having high lithium ion conductivity at room temperature and/or low temperature. In addition, since an oxidation voltage of the propionate-based ester compound is about 4.5 V or greater, lifespan characteristics of the battery may be improved due to resistance against degradation reaction of the electrolytic solution.

The amount of the propionate-based ester compound in the electrolytic solution may be at least 75% by volume based on a total volume of the non-aqueous organic solvent. For example, the amount of the propionate-based ester compound may be in a range of about 75% by volume to about 85% by volume based on the total volume of the non-aqueous organic solvent. When the amount of the propionate-based ester compound is within any of the ranges described above, the impregnation properties of the electrolytic solution into a thick-film electrode and ion conductivity of lithium ions may be improved, as compared to a linear carbonate-based ester compound. In addition, since the propionate-based ester compound has a low melting point, lithium salts may be easily dissolved in the electrolytic solution at room temperature and/or low temperature, and a liquid state of the electrolytic solution may be maintained, and thus the risk of formation of lithium dendrite during the charging and discharging of the battery may be prevented or reduce, thereby improving lifespan characteristics of the battery.

In some embodiments, the propionate-based ester compound includes at least 85% by volume of a propionate-based ester compound having at least 5 carbon atoms, based on a total volume of the propionate-based ester compound. The propionate-based ester compound having at least 5 carbon atoms may be represented by Formula 2 below.

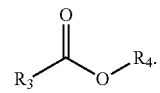

Formula 2

In Formula 2, $R_3$ is an ethyl group that is either unsubstituted or substituted with a halogen atom, and $R_4$ is a linear or branched C2-C6 alkyl group that is either unsubstituted or substituted with a halogen atom.

Since the propionate-based ester compound having at least 5 carbon atoms has a lower reactivity to lithium ions than a methyl propionate-based ester compound having 4 carbon atoms, side reactions of the electrolytic solution with the negative electrode may be reduced. In addition, when the amount of the propionate-based ester compound having at least 5 carbon atoms is at least 85% by volume based on the total volume of the propionate-based ester compound, a swelling phenomenon of a thick-film electrode of a pouch type (or kind) battery may be substantially controlled. For example, the propionate-based ester compound may include at least 90% by volume, at least 95% by volume, or 100% by volume of the propionate-based ester compound having at least 5 carbon atoms, based on the total volume of the propionate-based ester compound.

The propionate-based ester compound having at least 5 carbon atoms may be an ethyl propionate-based ester compound (such as ethyl propionate, 2-fluoroethyl propionate, 2,2-difluoroethyl propionate, 2,2,2-trifluoroethyl propionate, 2,2,2-trifluoroethyl 3-fluoropropanoate, 2,2,2-trifluoroethyl 3,3-difluoropropanoate, 2,2,2-trifluoroethyl 3,3,3-trifluoropropanoate, ethyl 3-fluoropropanoate, ethyl 3,3-difluoropropanoate, ethyl 3,3,3-trifluoropropanoate, or any combination thereof). For example, the propionate-based ester compound having at least 5 carbon atoms may be ethyl propionate.

In some embodiments, the propionate-based ester compound may further include a methyl propionate-based ester compound in the amount of less than or equal to about 15% by volume based on the total volume of the propionate-based ester compound.

When the propionate-based ester compound further includes the methyl propionate-based ester compound, in addition to the propionate-based ester compound having at least 5 carbon atoms, a viscosity of the resulting electrolytic solution may be reduced since a viscosity of the methyl propionate-based ester compound is lower than that of the propionate-based ester compound having at least 5 carbon atoms. Thus, the impregnation properties of the electrolytic solution may be further improved.

Non-limiting examples of the methyl propionate-based ester compound include methyl propionate, fluoromethyl propionate, difluoromethyl propionate, trifluoromethyl propionate, trifluoromethyl 3-fluoropropanoate, trifluoromethyl 3,3-difluoropropanoate, trifluoromethyl 3,3,3-trifluoropropanoate, methyl 3-fluoropropanoate, methyl 3,3-difluoropropanoate, methyl 3,3,3-trifluoropropanoate, and any combination thereof. For example, the methyl propionate-based ester compound may be methyl propionate.

The non-aqueous organic solvent may further include a cyclic carbonate compound, and non-limiting examples of the cyclic carbonate compound include ethylene carbonate (EC), propylene carbonate (PC), fluoroethylene carbonate (FEC), butylene carbonate, and any combination thereof. For example, EC, FEC, or any combination thereof may be used.

The amount of the cyclic carbonate compound may be less than or equal to about 25% by volume, for example, in a range of about 15% by volume to about 25% by volume based on a total volume of the non-aqueous organic solvent. Within any of the ranges described above, the dissociation of a lithium salt in the electrolytic solution may be facilitated by the cyclic carbonate having a dielectric constant of 20 or greater, and ion conductivity of the electrolytic solution may be further increased. In addition, the resulting electrolytic solution may have a low viscosity suitable for a thick-film negative electrode.

The lithium salt may be any lithium salt that is commonly used in lithium batteries and is soluble in an non-aqueous organic solvent. In some embodiments, the lithium salt includes at least one selected from LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic carboxylic acid lithium, lithium tetraphenyl borate, and imide.

The electrolytic solution may further include additives. For example, the electrolytic solution may include vinylene carbonate (VC), catechol carbonate (CC), and/or the like that may form and maintain a solid electrolyte interface (SEI) layer on the surface of the negative electrode; a redox-shuttle-type (or kind) additive (such as n-butyl ferrocene); halogen-substituted benzene and/or a film-forming additive (such as cyclohexyl benzene or biphenyl) to prevent overcharge; a cation receptor (such as a crown ether-based compound) and/or an anion receptor (such as a boron-based compound) to improve conductivity; and/or a phosphate-based compound (such as trimethyl phosphate (TMP), tris (2,2,2-trifluoroethyl)phosphate (TFP), or hexamethoxycyclotriphosphazene (HMTP)) as a flame retardant.

Hereinafter, a method of manufacturing the lithium secondary battery will be described.

The negative electrode may be manufactured, for example, by mixing the negative active material, a binder, and optionally, a conductive agent in a solvent to prepare a negative electrode slurry composition, and then molding the negative electrode slurry composition to a certain shape or coating the negative electrode slurry composition on a current collector, such as a copper foil.

The binder used in the negative electrode slurry composition assists binding the negative active material to the conductive agent, the current collector, and/or the like. The amount of the binder may be about 1 to about 50 parts by weight based on 100 parts by weight of the negative active material. For example, the amount of the binder may be in a range of about 1 to about 30 parts by weight, about 1 to about 20 parts by weight, or about 1 to about 15 parts by weight, based on 100 parts by weight of the negative active material. Examples of the binder may include polyvinylidene fluoride (PVdF), polyvinylidene chloride, polybenzimidazole, polyimide, polyvinyl acetate, polyacrylonitrile, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polystyrene, polymethyl methacrylate, polyaniline, acrylonitrile butadiene styrene, phenol resin, epoxy resin, polyethylene terephthalate, polytetrafluoroethylene, polyphenyl sulfide, polyamide-imide, polyetherimide, polyethylene sulfone, polyamide, polyacetal, polyphenylene oxide, polybutylenetelephthalate, ethylene-propylene-diene monomer (EPDM), sulfonated EPDM, styrene butadiene rubber (SBR), fluoride rubber, and any combination thereof, without being limited thereto.

The negative electrode may further include a conductive agent in order to further improve electrical conductivity by providing a sufficient conduction path to the negative active material. The conductive agent may be any conductive agent that is commonly used in lithium batteries. Non-limiting examples of the conductive agent include a carbonaceous material (such as carbon black, acetylene black, Ketjen black, or carbon fiber); a metal (such as copper, nickel, aluminum, or silver), each of which may be used in powder or fiber form; a conductive polymer (such as a polyphenylene derivative); and any suitable mixtures thereof. The amount of the conductive agent may be appropriately adjusted in accordance with the desired composition. For example, the conductive agent may be added such that a weight ratio of the negative active material to the conductive agent is in a range of about 99:1 to about 90:10.

Examples of the solvent include, without limitation, N-methylpyrrolidone (NMP), acetone, and water; and the solvent may be added to the negative electrode slurry composition in an amount suitable for the formation of the negative electrode mixture layer.

In some embodiments, the current collector may have a thickness of about 3 μm to about 500 μm. The current collector may be any suitable current collector that does not cause chemical change in a fabricated battery and has sufficient conductivity. Non-limiting examples of the current collector include copper, stainless steel, aluminum, nickel, titanium, calcined carbon, copper, stainless steel that is surface-treated with carbon, nickel, titanium and/or silver, and aluminum-cadmium alloys. In addition, the current collector may be processed to have fine irregularities on the surface thereof so as to enhance adhesive strength of the current collector to the positive active material, and may be used in any of various suitable forms including films, sheets, foils, nets, porous structures, foams, and non-woven fabrics.

The negative electrode may be prepared by directly coating the obtained negative electrode slurry composition on a copper current collector. Alternatively, the negative electrode may be prepared by casting the negative electrode slurry composition on a separate support, separating a negative active material film from the support and laminating it on a copper current collector to prepare a negative electrode plate, and then drying and pressing the negative electrode plate. A negative electrode mixture layer is formed on the surface of the current collector of the resulting negative electrode. In other words, the negative electrode mixture layer is obtained from a dried negative electrode slurry composition, in which the negative active material, the binder, the conductive agent, and/or the like are bound to one another, and includes all of the components added to the composition. The thickness of the negative electrode mixture layer may be as described above.

The positive electrode may be prepared in the same or substantially the same manner as the preparation of the negative electrode, except that a positive active material is used instead of the negative active material. A binder, a conductive agent, and a solvent used in a positive electrode slurry composition may be the same or substantially the same as those used in the negative electrode slurry composition.

Any suitable lithium-containing metal oxide that is commonly used in the art of lithium batteries may be used as the positive active material. For example, one or more composite oxide of lithium and at least one metal selected from cobalt, manganese, nickel, and any combination thereof may be used. Non-limiting examples of the composite oxide include compounds represented by the following formulas: $Li_aA_{1-b}B_bD_2$ (where $0.90 \leq a \leq 1$ and $0 \leq b \leq 0.5$); $Li_aE_{1-b}B_bO_{2-c}D_c$ (where $0.90 \leq a \leq 1$, $0 \leq b \leq 0.5$, and $0 \leq c \leq 0.05$); $LiE_{2-b}B_bO_{4-c}D_c$ (where $0 \leq b \leq 0.5$ and $0 \leq c \leq 0.05$); $Li_aNi_{1-b-c}Co_bB_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Co_bB_cO_{2-\alpha}F_\alpha$ (where $0.90 \leq a \leq 1$, $0 \leq b \leq 0.5$, $0 \leq c \leq 0.05$, and $0 < \alpha < 2$); $Li_aNi_{1-b-c}Co_bB_cO_{2-\alpha}F_2$ (where $0.90 \leq a \leq 1$, $0 \leq b \leq 0.5$, $0 \leq c \leq 0.05$, and $0 < \alpha < 2$); $Li_aNi_{1-b-c}Mn_bB_cD_\alpha$ (where $0.90 \leq a \leq 1$, $0 \leq b \leq 0.5$, $0 \leq c \leq 0.05$, and $0 < \alpha \leq 2$); $Li_aNi_{1-b-c}Mn_bB_cO_{2-\alpha}F_\alpha$ (where $0.90 \leq a \leq 1$, $0 \leq b \leq 0.5$, $0 \leq c \leq 0.05$, and $0 < \alpha < 2$); $Li_aNi_{1-b-c}Mn_bB_cO_{2-\alpha}F_2$ (where $0.90 \leq a \leq 1$, $0 \leq b \leq 0.5$, $0 \leq c \leq 0.05$, and $0 < \alpha < 2$); $Li_aNi_bE_cG_dO_2$ (where $0.90 \leq a \leq 1$, $0 \leq b \leq 0.9$, $0 \leq c \leq 0.5$, and $0.001 \leq d \leq 0.1$); $Li_aNi_bCo_cMn_dG_eO_2$ (where $0.90 \leq a \leq 1$, $0 \leq b \leq 0.9$, $0 \leq c \leq 0.5$, $0 \leq d \leq 0.5$, and $0.001 \leq e \leq 0.1$); $Li_aNiG_bO_2$ (where $0.90 \leq a \leq 1$ and $0.001 \leq b \leq 0.1$); $Li_aCoG_bO_2$ (where $0.90 \leq a \leq 1$ and $0.001 \leq b \leq 0.1$); $Li_aMnG_bO_2$ (where $0.90 \leq a \leq 1$ and $0.001 \leq b \leq 0.1$); $Li_aMn_2G_bO_4$ (where $0.90 \leq a \leq 1$ and $0.001 \leq b \leq 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ ($0 \leq f \leq 2$); $Li_{(3-f)}Fe_2(PO_4)_3$ ($0 \leq f \leq 2$); and $LiFePO_4$.

In the formulae above, A is nickel (Ni), cobalt (Co), manganese (Mn), or any combination thereof; B is aluminum (Al), nickel (Ni), cobalt (Co), manganese (Mn), chromium (Cr), iron (Fe), magnesium (Mg), strontium (Sr), vanadium (V), a rare earth element, or any combination thereof; D is oxygen (O), fluorine (F), sulfur (S), phosphorus (P), or any combination thereof; E is cobalt (Co), manganese (Mn), or any combination thereof; F is fluorine (F), sulfur (S), phosphorus (P), or any combination thereof; G is aluminum (Al), chromium (Cr), manganese (Mn), iron (Fe), magnesium (Mg), lanthanum (La), cerium (Ce), strontium (Sr), vanadium (V), or any combination thereof; Q is titanium (Ti), molybdenum (Mo), manganese (Mn), or any combination thereof; I is chromium (Cr), vanadium (V), iron (Fe), scandium (Sc), yttrium (Y), or any combination thereof; and J is vanadium (V), chromium (Cr), manganese (Mn), cobalt (Co), nickel (Ni), copper (Cu), or any combination thereof.

For example, the positive active material may include $LiCoO_2$, $LiMn_xO_{2x}$ (where x is 1 or 2), $LiNi_{1-x}Mn_xO_{2x}$ (where $0 < x < 1$), $LiNi_{1-x-y}Co_xMn_yO_2$ (where $0 \leq x \leq 0.5$ and $0 \leq y \leq 0.5$), $FePO_4$, and/or the like.

Each of the compounds listed above as positive active materials may have a coating layer on the surface thereof. Alternatively, a mixture of a compound not having a coating layer and a compound having a coating layer, the compounds being selected from the compounds listed above, may be used. The coating layer may include at least one compound of a coating element (such as an oxide, hydroxide, oxyhydroxide, oxycarbonate, or hydroxycarbonate) of the coating element. The compound included in the coating layer may be amorphous or crystalline. The coating element in the compound included in the coating layer may be Mg, Al, Co, K, Na, Ca, Si, Ti, V, Sn, Ge, Ga, B, As, Zr, or any mixture thereof. The coating layer may be formed using one ore more suitable methods, so long as it does not adversely affect the physical properties of the negative active material when the compound of the coating element is used, for example, by spray coating and/or immersion. The coating method should be apparent to those of ordinary skill in the art, and thus, a detailed description thereof will not be provided here.

The positive electrode may be prepared by directly coating the obtained positive electrode slurry composition on an aluminum current collector. Alternatively, the positive electrode may be prepared by casting the positive electrode slurry composition on a separate support, separating a positive electrode material film separated from the support and laminating it on an Al current collector to prepare a positive electrode plate, and then drying and pressing the resulting positive electrode plate. A positive electrode mixture layer is formed on the surface of the current collector of the prepared positive electrode.

The positive electrode and the negative electrode may be separated from each other by a separator. Any suitable separator that is commonly used in lithium batteries may be used. Particularly, a separator having low resistance to migration of ions of an electrolyte and excellent electrolytic solution-retaining ability may be used. Non-limiting examples of the separator may include glass fiber, polyester, Teflon, polyethylene, polypropylene, polytetrafluoroethylene (PTFE), and any combination thereof, each of which may be a nonwoven fabric or a woven fabric separator. In some embodiments, the separator has a pore diameter of about 0.01 to about 10 μm and a thickness of about 5 to about 300 μM.

Lithium secondary batteries may be classified into a winding type (or kind) or a stack type (stack) based on the shape of the electrode, and a cylindrical type, a rectangular type, a coin type, or a pouch type based to the type of exterior material.

The lithium secondary battery may be prepared by stacking electrode assemblies each having either a bi-cell structure of positive electrode/separator/negative electrode/separator/positive electrode or a layer-built cell structure in which a unit structure is repeated, inserting the resulting stack structure into a pouch, injecting an electrolytic solution into the pouch, and sealing the pouch.

A lithium secondary battery having this structure according to an exemplary embodiment of the present invention is illustrated in FIG. 1. Referring to FIG. 1, the lithium secondary battery is prepared by accommodating an electrode assembly 12, including positive electrodes 13, negative electrodes 15, and separators 14 between the positive electrodes 13 and the negative electrodes 15, in a can 10 together with an electrolytic solution, and sealing the top end portion of the can 10 with a cap assembly 20. The cap assembly 20 includes a cap plate 40, an insulating plate 50, a terminal plate 60, and an electrode terminal 30. The cap assembly 20 is coupled with an insulating case 70 to seal the can 10.

The electrode terminal 30 is inserted into a terminal through-hole 41 in the center of the cap plate 40. When the electrode terminal 30 is inserted into the terminal through-hole 41, a tube-type gasket 46 is coupled to the external surface of the electrode terminal 30 to insulate the electrode terminal 30 and the cap plate 40 from each other. After the cap assembly 20 is coupled to the top end portion of the can 10, the electrolytic solution is injected thereinto through an electrolytic solution inlet 42, and the electrolytic solution inlet 42 is then sealed by a plug 43. The electrode terminal 30 may be connected to a negative electrode tab 17 of the negative electrodes 15 or a positive electrode tab 16 of the positive electrodes 13, thus functioning as either a negative terminal or a positive terminal.

The lithium secondary battery according to embodiments of the present invention may be used not only as a power source for small-sized devices, but also as a unit battery of a larger battery module for middle-sized or large-sized devices including a plurality of batteries.

Examples of the middle-sized and large-sized devices include power tools; plug-in vehicles (xEVs) such as plug-in electric vehicles (EVs), hybrid electric vehicles (HEVs), or plug-in hybrid electric vehicles (PHEVs); electric motor-cycles such as E-bikes or E-scooters; electric golf carts; electric trucks; electric commercial vehicles; and energy storage systems, without being limited thereto. In addition, the lithium secondary battery may be used in all applications requiring high-power output, high voltage, and high temperature conditions for operations.

One or more embodiments of the present invention will be described in more detail with reference to the following examples. However, these examples are not intended to limit the scope of the one or more embodiments of the present invention.

PREPARATION OF ELECTROLYTIC SOLUTION

Comparative Preparation Example 1

An electrolytic solution was prepared by dissolving $LiPF_6$ in a non-aqueous organic solvent (prepared by mixing EC, EMC, and DEC in a volume ratio of 30:50:20, to a concentration of 1.15 M).

Comparative Preparation Example 2

An electrolytic solution was prepared by dissolving $LiPF_6$ in a non-aqueous organic solvent (prepared by mixing EC, FEC, EMC, and DEC in a volume ratio of 30:5:30:35, to a concentration of 1.15 M).

Comparative Preparation Example 3

An electrolytic solution was prepared by dissolving $LiPF_6$ in a non-aqueous organic solvent (prepared by mixing EC, FEC, EMC, and ethyl propionate (EP) in a volume ratio of 30:5:30:35, to a concentration of 1.15 M).

Comparative Preparation Example 4

An electrolytic solution was prepared by dissolving $LiPF_6$ in a non-aqueous organic solvent (prepared by mixing EC, FEC, and EP in a volume ratio of 30:5:65, to a concentration of 1.15 M).

Comparative Preparation Example 5

An electrolytic solution was prepared by dissolving $LiPF_6$ in a non-aqueous organic solvent (prepared by mixing EC, FEC, and EP in a volume ratio of 25:5:70, to a concentration of 1.15 M).

Comparative Preparation Example 6

An electrolytic solution was prepared by dissolving $LiPF_6$ in a non-aqueous organic solvent (prepared by mixing EC, FEC, and methyl propionate (MP) in a volume ratio of 15:5:80, to a concentration of 1.15 M).

Preparation Example 1

An electrolytic solution was prepared by dissolving $LiPF_6$ in a non-aqueous organic solvent (prepared by mixing EC, FEC, and EP in a volume ratio of 20:5:75, to a concentration of 1.15 M).

Preparation Example 2

An electrolytic solution was prepared by dissolving $LiPF_6$ in a non-aqueous organic solvent (prepared by mixing EC, FEC, and EP in a volume ratio of 15:5:80, to a concentration of 1.15 M).

Preparation Example 3

An electrolytic solution was prepared by dissolving $LiPF_6$ in a non-aqueous organic solvent (prepared by mixing EC, FEC, EP, and MP in a volume ratio of 15:5:70:10, to a concentration of 1.15 M).

Evaluation Example 1

Measurement of Viscosity of Electrolytic Solution

Viscosity of the electrolytic solutions prepared according to Comparative Preparation Examples 1 to 5 and Preparation Examples 1 to 3 was measured using a CPE-40 viscometer (Brookfield) at 25° C. The results are shown in Table 1 below.

TABLE 1

| | Lithium salt | Non-aqueous organic solvent (volume ratio) | Viscosity (cP) |
|---|---|---|---|
| Comparative Preparation Example 1 | 1.15M $LiPF_6$ | EC:EMC:DEC (30:50:20) | 5.12 |
| Comparative Preparation Example 2 | 1.15M $LiPF_6$ | EC:FEC:EMC:DEC (30:5:30:35) | 5.13 |
| Comparative Preparation Example 3 | 1.15M $LiPF_6$ | EC:FEC:EMC:EP (30:5:30:35) | 4.13 |
| Comparative Preparation Example 4 | 1.15M $LiPF_6$ | EC:FEC:EP (30:5:65) | 3.62 |
| Comparative Preparation Example 5 | 1.15M $LiPF_6$ | EC:FEC:EP (25:5:70) | 3.44 |
| Comparative Preparation Example 6 | 1.15M $LiPF_6$ | EC:FEC:MP (15:5:80) | 1.69 |

TABLE 1-continued

|  | Lithium salt | Non-aqueous organic solvent (volume ratio) | Viscosity (cP) |
|---|---|---|---|
| Preparation Example 1 | 1.15M LiPF$_6$ | EC:FEC:EP (20:5:75) | 2.97 |
| Preparation Example 2 | 1.15M LiPF$_6$ | EC:FEC:EP (15:5:80) | 2.92 |
| Preparation Example 3 | 1.15M LiPF$_6$ | EC:FEC:EP:MP (15:5:70:10) | 2.56 |

As can be seen from the results in Table 1, when DEC was replaced with EP of the same volume, the viscosity of the electrolytic solution decreased significantly. In addition, the viscosity of the electrolytic solution continued to decrease as the amount of EP in the non-aqueous organic solvent increased. The lowest viscosity of the electrolytic solutions of less than 3 cP was obtained in Preparation Examples 1 to 3 when the amount of EP was 75% by volume or greater.

Example 1

Preparation of Positive Electrode

A positive electrode slurry was prepared by mixing LiCoO2 as a positive active material, PVDF as a binder, and Denka Black as a conductive agent in a weight ratio of 94:3:3, and adding NMP, as a solvent, to the mixture such that a solid content (the content of the solids) was 80% by weight for adjustment of viscosity.

The prepared positive electrode slurry was coated on a 12 μm-thick Al current collector by using a method commonly used in the art. The current collector, on which the slurry was coated, was dried at room temperature, further dried at 120° C., and pressed to prepare a positive electrode having a current density of 5.5 mA/cm$^2$ and a loading level of 32 mg/cm$^2$. A thickness of the resulting positive electrode mixture layer was 73 μm.

Preparation of Negative Electrode

A negative electrode slurry was prepared by mixing spherical natural graphite (produced by POSCO CHEMTECH) coated with amorphous carbon (obtained by using pitch as a carbon precursor) and having an average diameter of 10 μm as a negative active material, and SBR and CMC as binders, in a weight ratio of 98:1:1, and adding NMP, as a solvent, to the mixture such that a solid content (the content of the solids) was 50% by weight for adjustment of viscosity.

The prepared negative electrode slurry was coated on a 8 μm-thick Cu current collector by using a method commonly used in the art. The current collector, on which the slurry was coated, was dried at room temperature, further dried at 120° C., and pressed to prepare a negative electrode having a current density of 5.5 mA/cm$^2$ and a loading level of 15.4 mg/cm$^2$. A thickness of the prepared negative electrode mixture layer was 93 μm.

Preparation of Lithium Secondary Battery

An electrode assembly including the positive electrode, the negative electrode, and a 124 μm-thick polyethylene (PE) separator, and the electrolytic solution prepared according to Preparation Example 2 injected therein were used to prepare a pouch-type battery having a width of 34 mm and a height of 50 mm.

Example 2

A positive electrode, a negative electrode, and a lithium secondary battery were manufactured in the same or substantially the same manner as in Example 1, except that spherical natural graphite having an average diameter of 18 μm and coated with amorphous carbon was used as the negative active material.

Example 3

A positive electrode, a negative electrode, and a lithium secondary battery were manufactured in the same or substantially the same manner as in Example 1, except that artificial graphite having an average diameter of 18 μm (BTR) was used as the negative active material.

Comparative Example 1

A positive electrode, a negative electrode, and a lithium secondary battery were manufactured in the same or substantially the same manner as in Example 1, except that the electrolytic solution prepared according to Comparative Preparation Example 4 was used.

Comparative Example 2

A positive electrode, a negative electrode, and a lithium secondary battery were manufactured in the same or substantially the same manner as in Example 2, except that the electrolytic solution prepared according to Comparative Preparation Example 4 was used.

Comparative Example 3

A positive electrode, a negative electrode, and a lithium secondary battery were manufactured in the same or substantially the same manner as in Example 3, except that the electrolytic solution prepared according to Comparative Preparation Example 4 was used.

Evaluation Example 2

Evaluation of Impregnation Property of Electrolytic Solution According to Type of Negative Active Material The negative electrode slurries prepared according to Examples 1 to 3 and Comparative Examples 1 to 3 were each dried in an oven at 100° C. Then, the dry product was ground using a mortar to prepare powder. 2 g of the powder was added to a mold and formed into pellets by applying pressure of about 0.5 ton to about 2 ton in accordance with the type of the respective negative active material. A pellet density was calculated as follows:

Pellet density (g/cc)=Weight of active material (g)/ ((area of pellet (cm$^2$)×height of pellet (cm))

Figure 2:
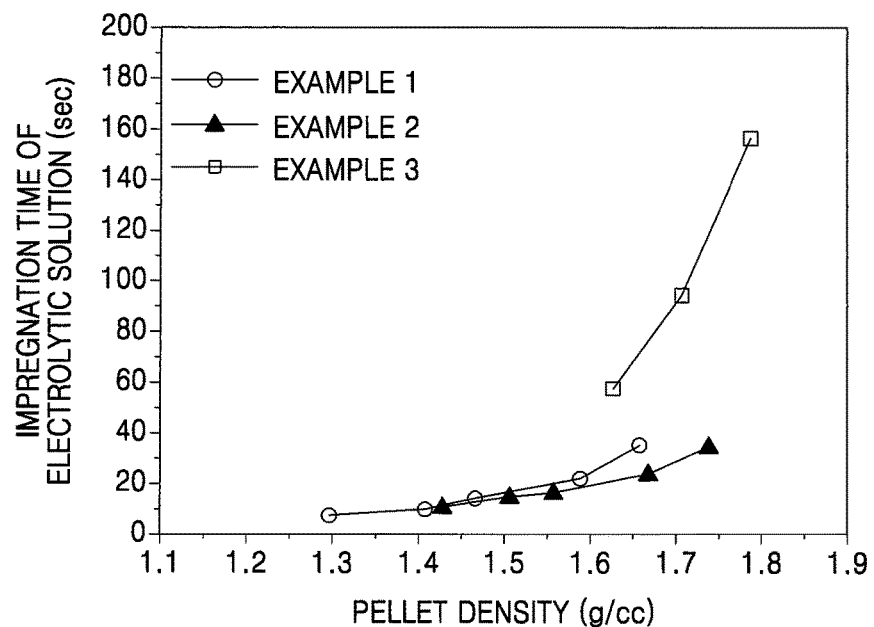
FIG. 2 is a graph of impregnation properties of an electrolytic solution prepared according to Preparation Example 2 into each of the negative electrodes prepared according to Examples 1 to 3.

Electrolytic solution impregnation properties of each negative active material were evaluated by applying the electrolytic solution to the surfaces of the pellets and measuring the time it took for the pellets to reach pellet density of 1.65 g/cc after 20 μl of the electrolytic solution was completely absorbed by the pellets. Impregnation times of each negative active material are shown in Table 2 below. The impregnation properties of the electrolytic solutions with respect to the pellet density are shown in FIG. 2.

TABLE 2

|  | Example 1 | Example 2 | Example 3 | Comparative Example 1 | Comparative Example 2 | Comparative Example 3 |
|---|---|---|---|---|---|---|
| Negative active material | Spherical graphite coated with amorphous carbon (diameter: 10 μm) | Spherical graphite coated with amorphous carbon (diameter: 18 μm) | Artificial graphite (diameter: 18 μm) | Spherical graphite coated with amorphous carbon (diameter: 10 μm) | Spherical graphite coated with amorphous carbon (diameter: 18 μm) | Artificial graphite (diameter: 18 μm) |
| Non-aqueous organic solvent of electrolytic solution (Volume ratio) | EC:FEC:EP (15:5:80) | EC:FEC:EP (15:5:80) | EC:FEC:EP (15:5:80) | EC:FEC:EP (30:5:65) | EC:FEC:EP (30:5:65) | EC:FEC:EP (30:5:65) |
| Impregnation time (sec) | 26 | 18 | 57 | 32 | 30 | 67 |

As can be seen from the results in Table 2, the impregnation times of the electrolytic solutions having a viscosity of 3 cP or less and including 80% by volume of EP into the thick-film negative electrode (Examples 1 to 3) are shorter than those of the electrolytic solutions including 65% by volume of EP (Comparative Examples 1 to 3). Without being bound by any particular theory, it is believed that the lower viscosity of the electrolytic solution may improve the degree to which the electrolytic solution is absorbed by the negative active material particles.

In addition, as shown in FIG. 2, as the pellet density increases, i.e., as the thickness of the thick-film negative electrode increases, the impregnation time continuously increases.

Therefore, even when the same electrolytic solution is used, the impregnation properties may still vary according to the type of the negative active material used. As shown in FIG. 2, even when the negative active material including the spherical graphite coated with amorphous carbon pitch has the same particle diameter as that of the negative active material including artificial graphite, the former exhibits a more gentle and smooth increase in impregnation time of the electrolytic solution with respect to the pellet density than the latter. These results indicate than the electrolytic solution may have an improved degree of impregnation into the thick-film negative electrodes including the spherical natural graphite as compared to the thick-film negative electrodes including the artificial graphite. In addition, since the impregnation time of the pellets according to Example 2 is shorter than that of the pellets according to Example 1, a larger average particle diameter of the negative active material may increase impregnation properties of the electrolytic solution.

Example 4

A positive electrode, a negative electrode, and a lithium secondary battery were manufactured in the same or substantially the same manner as in Example 1, except that spherical natural graphite having an average diameter of 18 μm and coated with amorphous carbon was used as the negative active material and the electrolytic solution according to Preparation Example 1 was used.

Examples 5 and 6

Positive electrodes, negative electrodes, and lithium secondary batteries were manufactured in the same or substantially the same manner as in Example 4, except that the electrolytic solutions according to Preparation Examples 2 and 3 were respectively used.

Example 7

A negative electrode having a current density of 4.0 mA/cm$^2$ and a loading level of 11.2 mg/cm$^2$ and including a negative electrode mixture layer having a thickness of 68 μm was manufactured using the negative electrode slurry prepared according to Example 5 and varying the load during pressing. Then a positive electrode and a lithium secondary battery were each manufactured in the same or substantially the same manner as in Example 5, except that the negative electrode as described above was used instead of the negative electrode according to Example 5.

Example 8

A negative electrode having a current density of 7.0 mA/cm$^2$ and a loading level of 19.6 mg/cm$^2$ and including a negative electrode mixture layer having a thickness of 119 μm was manufactured using the negative electrode slurry prepared according to Example 5 and varying the load during pressing. Then a positive electrode and a lithium secondary battery were each manufactured in the same or substantially the same manner as in Example 5, except that the negative electrode described above was used instead of the negative electrode according to Example 5.

Comparative Examples 4 to 9

Positive electrodes, negative electrodes, and lithium secondary batteries of Comparative Examples 4 to 9 were each manufactured in the same or substantially the same manner as in Example 4, except that the electrolytic solutions prepared according to Comparative Preparation Examples 1 to 6 were respectively used.

Comparative Example 10

A negative electrode having a current density of 3.5 mA/cm$^2$ and a loading level of 9 mg/cm$^2$ and including a negative electrode mixture layer having a thickness of 56 μm was manufactured using the negative electrode slurry prepared according to Comparative Example 4 and varying the load during pressing. Then, a positive electrode and a lithium secondary battery were each manufactured in the same manner as in Example 5, except that the negative electrode described above was used instead of the negative electrode according to Comparative Example 4.

Comparative Example 11

A negative electrode having a current density of 3.5 mA/cm$^2$ and a loading level of 9 mg/cm$^2$ and including a negative electrode mixture layer having a thickness of 56 μm was manufactured using the negative electrode slurry prepared according to Example 5 and varying the load during pressing. Then, a positive electrode and a lithium secondary battery were each manufactured in the same or substantially the same manner as in Example 5, except that the negative electrode described above was used instead of the negative electrode according to Example 5.

(Effect of Low-viscosity Electrolytic Solution on Thick-film Negative Electrode)

Evaluation Example 3

Evaluation of Impregnation Property of Electrolytic Solution

Pellets were prepared in the same or substantially the same manner as in Evaluation Example 2 using the negative electrode slurry prepared according to Example 5. 20 μl of the electrolytic solution prepared according to Preparation Example 2 was applied to some of the prepared pellets, and 20 me of the electrolytic solution prepared according to Comparative Preparation Example 1 was applied to the other prepared pellets. Then, times required for the electrolytic solutions to be completely absorbed by the pellets with respect to the pellet density were measured. The results are shown in FIG. 3.

Figure 3:
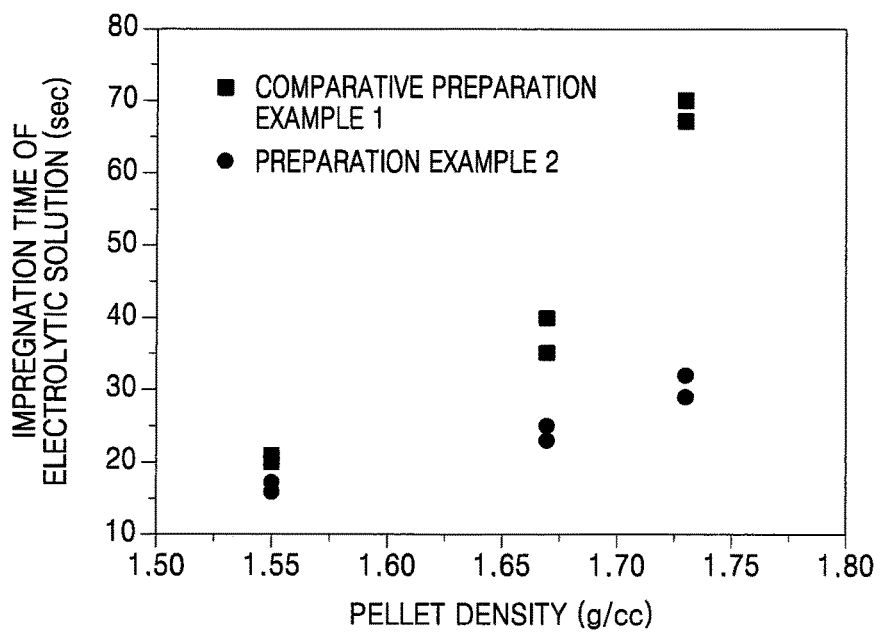
FIG. 3 is a graph of impregnation properties of electrolytic solutions prepared according to Preparation Example 2 and Comparative Preparation Example 1 into a negative electrode prepared according to Example 5.

Referring to FIG. 3, the electrolytic solution having a viscosity of 3 cP or less and including 80% by volume of EP (Preparation Example 2) exhibited more gentle and smooth increase in impregnation time with respect to the pellet density than the electrolytic solution including EP in an amount less than the amount described in the present embodiments (Comparative Preparation Example 1). This is at least partially because the electrolytic solution according to Preparation Example 2 had lower viscosity and improved impregnation into the negative active material particles.

In addition, as the pellet density increases, i.e., as the thickness of the negative electrode increases, the impregnation time starts to vary depending on the types of the electrolytic solution. Thus, the impregnation properties of the electrolytic solution in thick-film negative electrodes are more influenced by viscosity and composition of the electrolytic solution than the impregnation properties in thin-film negative electrodes.

Evaluation Example 4

Evaluation of Discharge Rate

The lithium secondary batteries prepared according to Examples 5, 7, and 8 and Comparative Examples 4, 10, and 11 were each charged under a constant current-constant voltage (CC-CV) condition at a charging current of 0.2 C and a charging voltage of 4.35 V at 25° C., rested for 10 minutes, and discharged at a current of 0.2 C to 1.0 C until the voltage reached 3 V. A discharge capacity at 0.2 C was used as a reference capacity, and discharge rates at 0.5 C, 0.7 C, and 1.0 C were measured and shown in Table 3 below. Here, the discharge rate was calculated using Equation 1 below.

Relative discharge rate (as compared to the discharge rate at 0.2 C) [%]=[discharge capacity at each discharge current/discharge capacity at 0.2 C]×100          Equation 1

TABLE 3

| | Current density (mA/cm$^2$) | Non-aqueous organic solvent (volume ratio) | Relative discharge rate as compared to the discharge rate at 0.2 C (%) | | |
|---|---|---|---|---|---|
| | | | 0.5 C | 0.7 C | 1.0 C |
| Comparative Example 4 | 5.5 | EC:EMC:DEC (30:50:20) | 94.6 | 81.4 | 60.6 |
| Example 5 | 5.5 | EC:FEC:EP (15:5:80) | 98.9 | 96.7 | 86.8 |
| Example 7 | 4.0 | EC:FEC:EP (15:5:80) | 99.4 | Not measured | 98.3 |
| Example 8 | 7.0 | EC:FEC:EP (15:5:80) | 97.2 | Not measured | 60.5 |
| Comparative Example 10 | 3.5 | EC:EMC:DEC (30:50:20) | 99.1 | 98.1 | 95.9 |
| Comparative Example 11 | 3.5 | EC:FEC:EP (15:5:80) | 99.1 | 98.3 | 97.2 |

As shown in Table 3, discharge rates of the lithium batteries including negative electrodes having a low current density (Comparative Examples 10 and 11) were not significantly influenced by the composition of the non-aqueous organic solvent. However, discharge rates of the lithium batteries including the thick-film negative electrodes having a high current density (Comparative Example 4 and Example 5) significantly vary in accordance with the composition of the non-aqueous organic solvent. That is, high rate discharge characteristics of the lithium batteries including the thick-film negative electrode and the non-aqueous organic solvent having the composition according to one or more embodiments were considerably improved. This is at least partially because the rate properties were improved with the improvement of wettability of the thick-film negative electrode by the electrolytic solution and ion conductivity.

Evaluation Example 5

Discharge Profile

Figure 4:
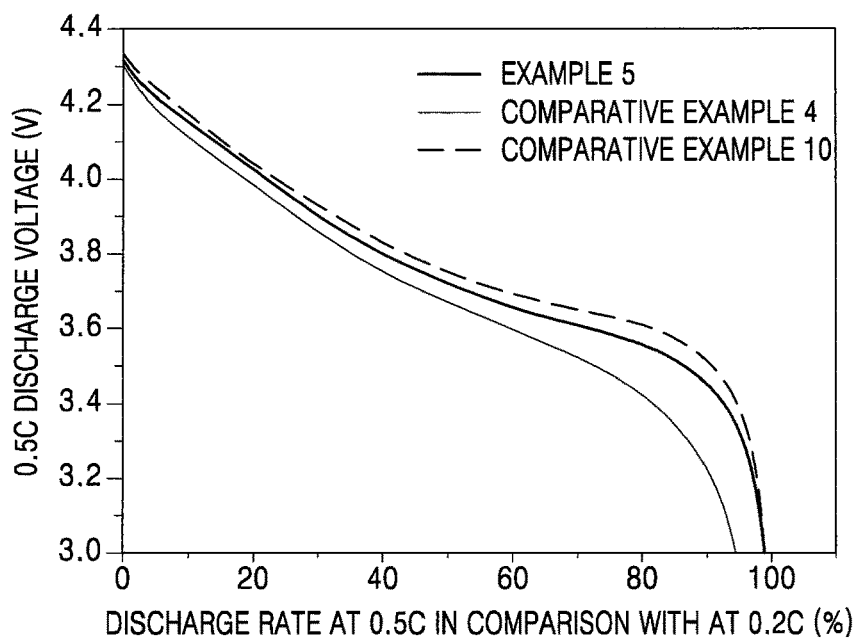
FIG. 4 is a graph of 0.5 C discharge profiles of batteries prepared according to Example 5 and Comparative Examples 4 and 10.

Discharge profiles of the lithium secondary batteries manufactured according to Example 5 and Comparative Examples 4 and 10 at 0.5 C as compared to the discharge profile at 0.2 C are shown in FIG. 4.

As illustrated in FIG. 4, although a thick-film negative electrode was used, the battery of Example 5, including the electrolytic solution prepared according to Preparation Example 2, exhibited a 0.5 C discharge profile similar to that of the battery of Comparative Example 10 including a negative electrode having a lower current density and the electrolytic solution prepared according to Comparative Preparation Example 1. In contrast, the battery of Comparative Example 4 including a thick-film negative electrode and the electrolytic solution prepared according to Comparative Preparation Example 1 exhibited a rapid voltage drop at the end of discharge.

Figure 5A:
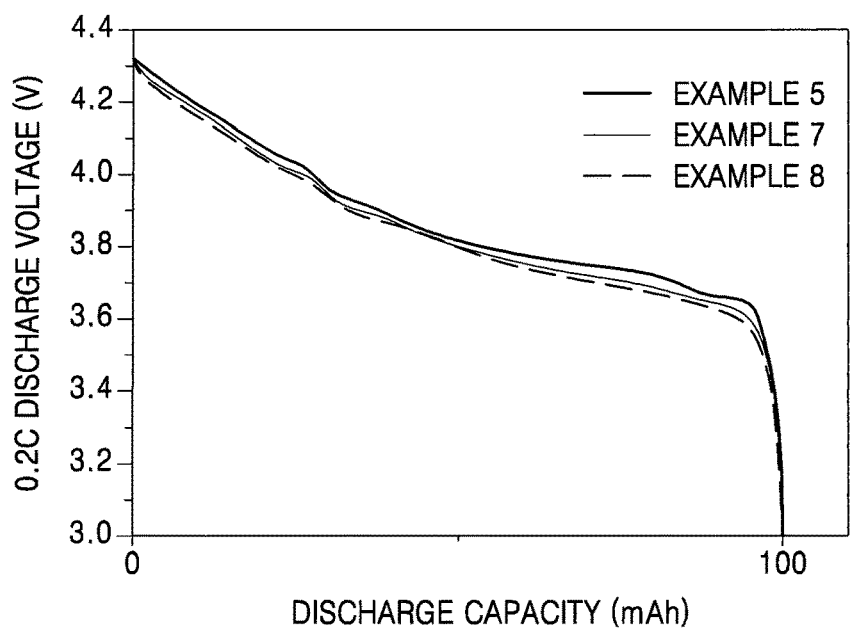
FIG. 5A is a graph of 0.2 C discharge profiles of batteries prepared according to Examples 5, 7, and 8.
Figure 5B:
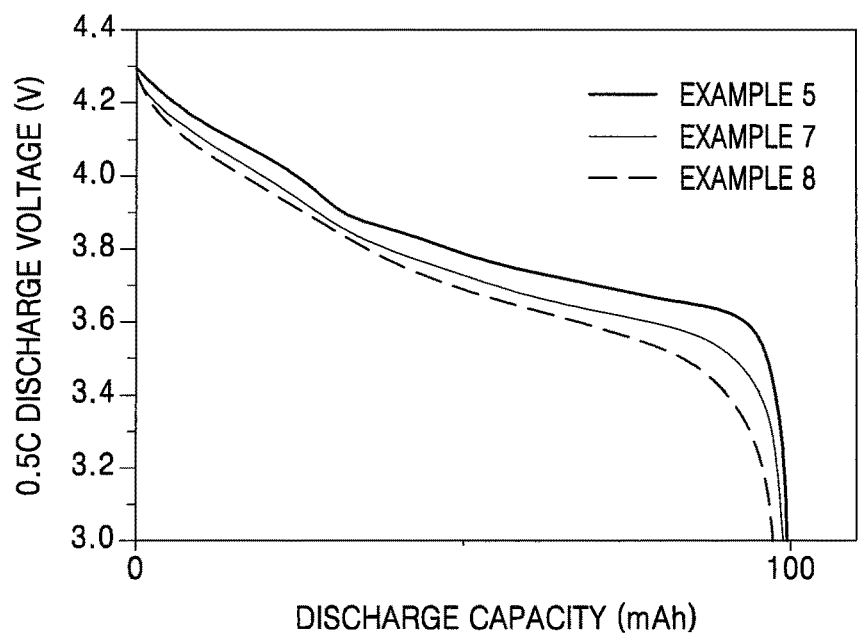
FIG. 5B is a graph of 0.5 C discharge profiles of batteries prepared according to Examples 5, 7, and 8.
Figure 5C:
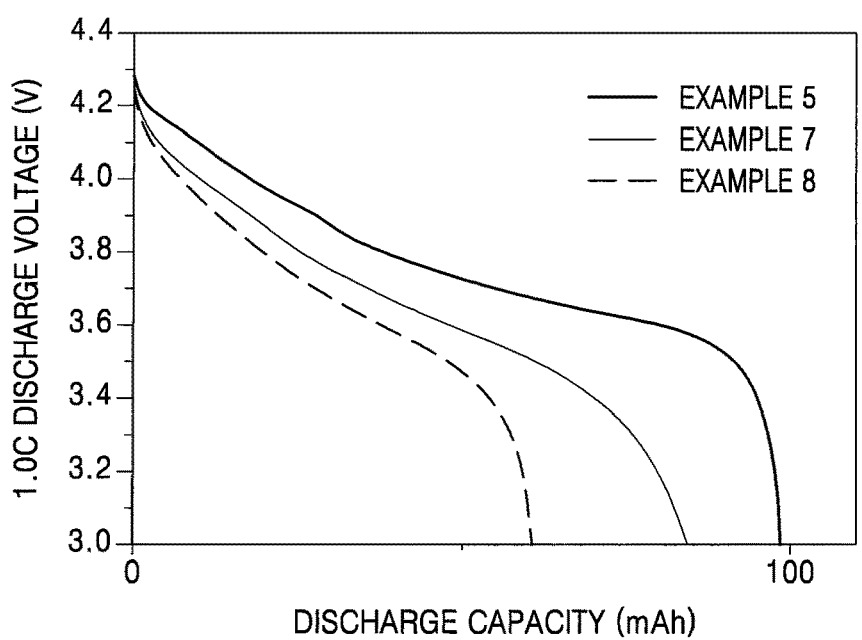
FIG. 5C is a graph of 1.0 C discharge profiles of batteries prepared according to Examples 5, 7, and 8.

Also, discharge profiles at 0.5 C and 1.0 C of the lithium secondary batteries manufactured according to Examples 5, 7, and 8 as compared to the discharge profile at 0.2 C are shown in FIGS. 5A to 5C.

As illustrated in FIGS. 5A to 5C, at 0.2 C, the discharge voltage of the batteries does not significantly decrease although the current density increases, and at 1.0 C, the degrees of voltage drops at the end of discharge vary as the current density increases.

Evaluation Example 6

Evaluation of Actual/Theoretical Capacity Rate and Lifespan Characteristics

The lithium secondary batteries manufactured according to Example 5 and Comparative Examples 4 and 10 were each charged at a constant current of 0.2 C at 25° C. until the voltage reached 4.35 V and charged at a constant voltage of 4.35 V until the current reached 0.05 C, and then discharged at a constant current of 0.2 C until the voltage reached 3.0 V (Formation).

Then, the lithium secondary batteries were each charged at a constant current of 0.5 C until the voltage reached 4.35 V and charged at a constant voltage of 4.35 V until the current reached 0.05 C, and then discharged at a constant current of 0.2 C until the voltage reached 3.0 V (Rating).

After the formation and rating, a cycle of charging each lithium secondary battery at a constant current of 0.5 C at 25° C. until the voltage reached 4.3 V and at a constant voltage of 4.3 V until the current reached 0.05 C, and then discharging the lithium secondary battery at a constant current of 0.5 C until the voltage reached 3.0 V was repeated 100 times.

An actual/theoretical capacity rate was obtained by dividing a discharge capacity at the $1^{st}$ cycle by a theoretical capacity of 1100 mAh and the results are listed in Table 4 below. Here, the actual/theoretical capacity rate was calculated using Equation 2.

Actual/theoretical capacity rate [%]=[discharge capacity at $1^{st}$ cycle/theoretical capacity]×100    Equation 2

TABLE 4

|  | Actual/theoretical capacity rate (%) |
| --- | --- |
| Comparative Example 4 | 90 |
| Example 5 | 98 |
| Comparative Example 10 | 100 |
| Comparative Example 11 | 100 |

As shown in Table 5, the lithium secondary batteries, including a negative electrode having a low current density (Comparative Examples 10 and 11), may obtain 100% of the theoretical capacity regardless of the composition of the non-aqueous organic solvent. On the other hand, the actual/theoretical capacity rate of the lithium secondary battery using a thick-film negative electrode having a high current density prepared according to Example 5 was considerably increased by using the non-aqueous organic solvent according to an exemplary embodiment as compared to high current density battery of Comparative Example 4.

Figure 6:
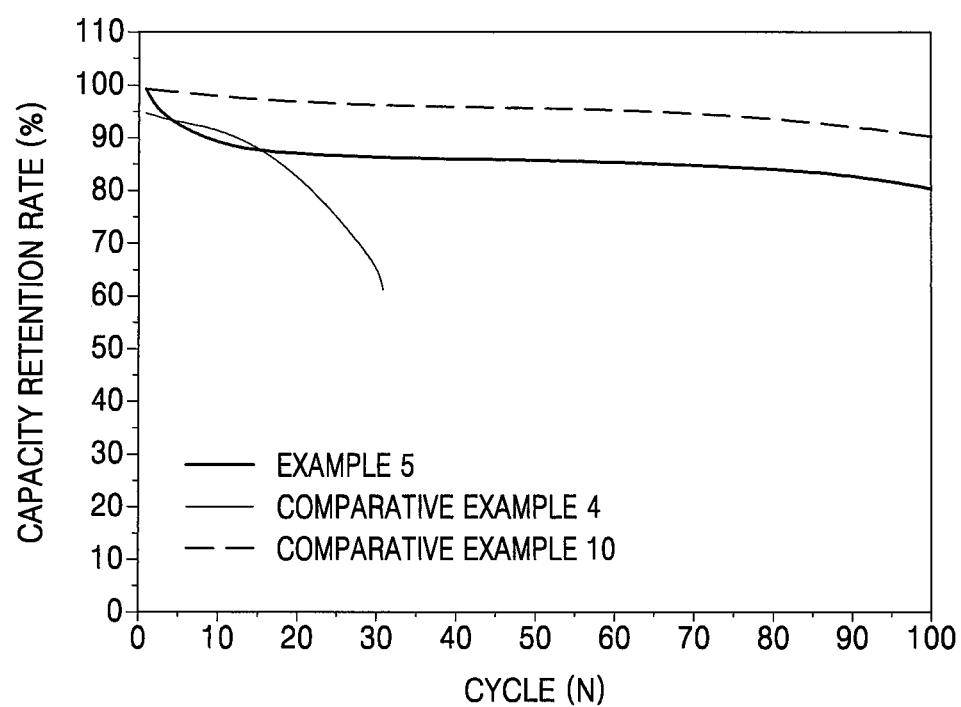
FIG. 6 is a graph of capacity retention rates of batteries prepared according to Example 5 and Comparative Examples 4 and 10 with respect to cycle.

In addition, lifespan characteristics were measured using a capacity retention rate (CRR), and the results are shown in FIG. 6. Here, the capacity retention rate was calculated using Equation 3 below.

Capacity retention rate [%]=[discharge capacity at each cycle/discharge capacity at $1^{st}$ cycle]×100    Equation 3

As illustrated in FIG. 6, the lithium secondary battery prepared according to Comparative Example 4 had poor lifespan characteristics at least partially due to the fact that the impregnation properties of the electrolytic solution deteriorated and side reactions with the electrolytic solution increased. In contrast, the lithium secondary battery prepared according to Example 5 had excellent impregnation properties and excellent rate properties as described above, even though a thick-film negative electrode was used therein, thereby exhibiting a lifespan slope similar to that of the lithium secondary battery including a negative electrode having a low current density (Comparative Example 10) after 10 cycles.

(Influence of Viscosity of Electrolytic Solution and Composition of Non-aqueous Organic Solvent)

Evaluation Example 7

Evaluation of Lifespan Characteristics

Capacity retention rates of each of the lithium secondary batteries manufactured according to Examples 4 to 6 and Comparative Examples 5 to 9 were measured using the lifespan characteristics evaluation method described above, and the results are shown in FIG. 7.

Figure 7:
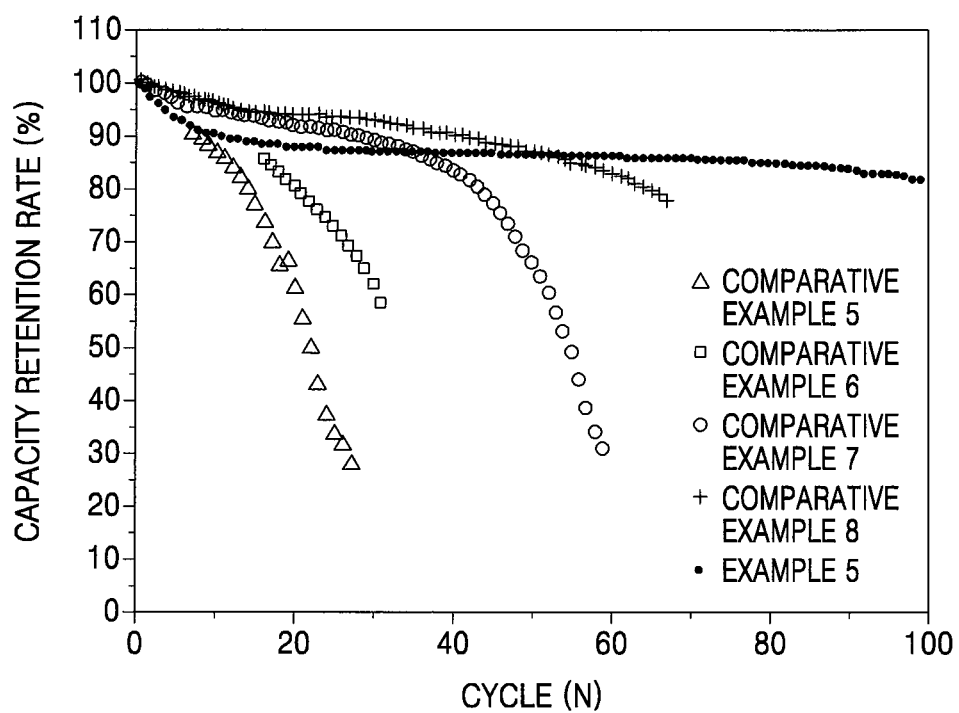
FIG. 7 is a graph of capacity retention rates of batteries prepared according to Example 5 and Comparative Examples 5 to 8 with respect to cycle.

As illustrated in FIG. 7, the capacity retention rate of the battery of Comparative Example 6 including the electrolytic solution prepared according to Comparative Preparation Example 3 was greater than that of the battery of Comparative Example 5 including the electrolytic solution prepared according to Comparative Preparation Example 2. This is at least partially because replacing DEC with EP in the same amount increases ion conductivity since EP has a lower viscosity and a higher specific dielectric constant than DEC. Thus, lifespan characteristics of the battery may be improved.

Accordingly, the capacity retention rate increases, as the amount of EP increases in the non-aqueous organic solvent. For example, the significantly increased capacity retention rates were observed in the lithium secondary batteries of Examples 4 to 6 including the electrolytic solutions prepared according to Preparation Examples 1 to 3 and having a viscosity less than 3 cP. Accordingly, the viscosity of the electrolytic solution of 3 cP or less and the amount of the propionate-based ester compound in the non-aqueous organic solvent of at least 75% by volume based on the total volume of the non-aqueous organic solvent may improve lifespan characteristics of batteries.

In addition, the battery of Comparative Example 9 including the electrolytic solution prepared according to Comparative Preparation Example 6 including 80% by volume of MP in the non-aqueous organic solvent did not improve the capacity retention rate to the same extent as the battery of Example 5 using the same amount of EP, despite low viscosity of the electrolytic solution. This is at least partially because MP has high reactivity to lithium ions and may cause swelling during charging and discharging. On the other hand, when EP and MP are mixed in the non-aqueous organic solvent in an appropriate ratio (for example, as in the battery of Example 6), the capacity retention rate was significantly improved.

As described above, the lithium secondary battery according to the one or more of the above embodiments includes a thick-film negative electrode having a current density of about 4.0 mA/cm$^2$ to 7.0 mA/cm$^2$ and an electrolytic solution having a viscosity of 3 cP or less and including a propionate-based ester compound, as a non-aqueous organic solvent, the propionate-based ester compound including a propionate-based ester compound having at least 5 carbon atoms in a range described above. Accordingly, the impregnation properties of the electrolytic solution into the thick-film negative electrode may be improved and the mobility of lithium ions may not decrease, or may decrease to a lesser extent, during charging and discharging. Thus, the capacity of the battery may be increased using the thick-film negative electrode, and the rate properties and lifespan characteristics of the battery may be improved.

It should be understood that the exemplary embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims and equivalents thereof.

What is claimed is:

1. A lithium secondary battery comprising a negative electrode, a positive electrode, and an electrolytic solution,
    the negative electrode having a current density of about 4.0 mA/cm$^2$ to about 7.0 mA/cm$^2$,
    the electrolytic solution comprising a lithium salt and a non-aqueous organic solvent,
    the non-aqueous organic solvent comprising at least 75% by volume of a propionate-based ester compound based on a total volume of the non-aqueous organic solvent,
    the propionate-based ester compound comprising at least 85% by volume of a propionate-based ester compound having at least 5 carbon atoms based on a total volume of the propionate-based ester compound, and
    the electrolytic solution having a viscosity of about 3 cP or less.

2. The lithium secondary battery of claim 1, wherein a loading level of the negative electrode is in a range of about 10 mg/cm$^2$ to about 20 mg/cm$^2$.

3. The lithium secondary battery of claim 1, wherein the negative electrode comprises a current collector and a negative electrode mixture layer,
    the negative electrode mixture layer comprises a negative active material, and
    the negative electrode mixture layer has a thickness of about 60 μm to about 130 μm.

4. The lithium secondary battery of claim 3, wherein the negative active material comprises crystalline carbon.

5. The lithium secondary battery of claim 4, wherein the crystalline carbon further comprises an amorphous carbon coating layer on the surface of the crystalline carbon.

6. The lithium secondary battery of claim 4, wherein the crystalline carbon comprises natural graphite.

7. The lithium secondary battery of claim 6, wherein the natural graphite is spherical natural graphite.

8. The lithium secondary battery of claim 6, wherein the amount of the natural graphite is at least 50% by weight based on a total weight of the negative active material.

9. The lithium secondary battery of claim 1, wherein the propionate-based ester compound is represented by Formula 1:

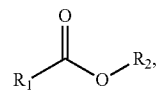

Formula 1 wherein $R_1$ is an unsubstituted ethyl group or an ethyl group substituted with a halogen atom, and $R_2$ is a linear or branched unsubstituted C1-C6 alkyl group or a linear or branched C1-C6 alkyl group substituted with a halogen atom.

10. The lithium secondary battery of claim 1, wherein the propionate-based ester compound having at least 5 carbon atoms is represented by Formula 2:

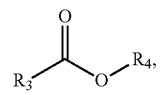

Formula 2 wherein $R_3$ is an unsubstituted ethyl group or an ethyl group substituted with a halogen atom, and $R_4$ is a linear or branched unsubstituted C2-C6 alkyl group or a linear or branched C2-C6 alkyl group substituted with a halogen atom.

11. The lithium secondary battery of claim 10, wherein the propionate-based ester compound having at least 5 carbon atoms is an ethyl propionate-based ester compound.

12. The lithium secondary battery of claim 1, wherein the propionate-based ester compound further comprises a methyl propionate-based ester compound.

* * * * *